United States Patent
Palumbo et al.

(10) Patent No.: US 6,827,164 B2
(45) Date of Patent: Dec. 7, 2004

(54) INDUSTRIAL TRUCK

(76) Inventors: Anthony J. Palumbo, 28785 White Rd., Perrysburg, OH (US) 43551; Richard A. Hallett, 10466 County Rd. 5, Delta, OH (US) 43515; Jeffrey T. Major, 6998 Potter Rd., Cygnet, OH (US) 43413

( * ) Notice: Subject to any disclaimer, the term of this patent is extended or adjusted under 35 U.S.C. 154(b) by 13 days.

(21) Appl. No.: 10/247,988

(22) Filed: Sep. 20, 2002

(65) Prior Publication Data

US 2003/0057002 A1 Mar. 27, 2003

Related U.S. Application Data

(60) Provisional application No. 60/324,198, filed on Sep. 21, 2001.

(51) Int. Cl.[7] .................................................. B60K 1/00
(52) U.S. Cl. ...................................... 180/65.1; 280/442
(58) Field of Search ...................... 180/65.1, 23, 24.01, 180/418, 419; 280/442, 443, 444, 419, 426

(56) References Cited

U.S. PATENT DOCUMENTS

| | | | | |
|---|---|---|---|---|
| 2,092,683 A | * | 9/1937 | Stidham | 280/443 |
| 3,437,163 A | | 4/1969 | Lemmerman | |
| 3,576,488 A | * | 4/1971 | Zug et al. | 340/636.15 |
| 3,669,469 A | * | 6/1972 | Hartelius | 280/492 |
| 4,116,298 A | * | 9/1978 | Hyler | 180/420 |
| 4,117,901 A | * | 10/1978 | Mustered | 180/23 |
| 4,196,785 A | * | 4/1980 | Downing, Jr. | 180/6.28 |
| 4,202,453 A | * | 5/1980 | Wilkes et al. | 212/290 |
| 4,207,691 A | * | 6/1980 | Hyler et al. | 37/413 |
| 4,207,692 A | * | 6/1980 | Hyler et al. | 37/414 |
| 4,283,074 A | * | 8/1981 | Tidwell | 280/124.103 |
| 4,368,795 A | * | 1/1983 | Tidwell | 180/212 |
| 4,405,147 A | * | 9/1983 | Horsman et al. | 280/443 |
| 4,451,058 A | * | 5/1984 | Curry | 280/476.1 |
| 4,556,356 A | | 12/1985 | Niva | |
| 4,809,805 A | * | 3/1989 | Short | 180/420 |
| 4,890,684 A | | 1/1990 | Simmons | |
| 5,120,182 A | * | 6/1992 | Hvolka | 414/487 |
| 5,244,226 A | * | 9/1993 | Bergh | 280/442 |
| 5,305,844 A | * | 4/1994 | Ducote | 180/24.01 |
| 5,364,117 A | * | 11/1994 | Keith | 280/459 |
| 5,742,975 A | | 4/1998 | Knowlton et al. | |
| 6,012,272 A | | 1/2000 | Dillon | |
| 6,116,697 A | | 9/2000 | Smith et al. | |
| 6,125,618 A | | 10/2000 | Dillon | |
| 6,604,351 B2 | * | 8/2003 | Dillon | 56/14.6 |

* cited by examiner

Primary Examiner—Christopher P. Ellis
Assistant Examiner—Kelly E Campbell
(74) Attorney, Agent, or Firm—Emch, Schaffer, Schaub & Porcello Co., L.P.A.

(57) ABSTRACT

An industrial truck having a drive portion including wheels being connected to an electric motor being connected to a power source and a trailer portion having wheels. The industrial truck includes a steering system positioned on the drive portion connected to the trailer portion to provide articulated steering of the industrial truck. The industrial truck further including a control device to vary the speed of the motor to vary the speed of the industrial truck.

20 Claims, 8 Drawing Sheets

US 6,827,164 B2

INDUSTRIAL TRUCK

RELATED APPLICATION

The present application relates to and claims the benefit of U.S. Provisional Patent Application No. 60/324,198, filed on Sep. 21, 2001.

BACKGROUND OF THE INVENTION

The present invention relates generally to industrial trucks also referred to as burden carriers. More specifically, the invention is directed to a vehicle that can be used to move or haul various types of equipment and perform various ancillary tasks. Industrial trucks typically find applications in, for example, factories, construction sites, farms and grounds keeping. They have also been fitted with additional seats in order to shuttle people from place to place.

In the past, industrial trucks have been large and difficult to maneuver. It has been found that there is a need for a relatively small and narrow industrial truck that is economical and easy to maneuver. Further, past industrial trucks have been powered by dedicated power sources through mechanical or hydraulic transmissions. Many of these vehicles carry an additional power source such as a generator as part of the equipment load. It has been found that it is desirable to utilize the additional power source as the main power source for the industrial truck to keep weight, maintenance and operating cost down. The present invention satisfies these and other needs.

SUMMARY OF THE INVENTION

The present invention includes, among other things, a drive portion often referred to as a tractor and a trailer portion. The drive portion includes a pair of wheels operatively connected to an electric motor. The drive portion further includes an articulated steering mechanism.

The trailer portion is connected to the drive portion by a pivot and a steering linkage. The trailer portion includes a pair of wheels. The trailer portion includes a bed for supporting equipment. In one embodiment, the trailer portion supports equipment having auxiliary power outlets. This equipment includes, for example, engine drive generator, batteries, constant voltage generators, fuel cells and microturbines. The motor of the drive portion is in electrical communication with the power outlets.

The primary object of the present invention is to provide an industrial truck that is relatively small and easy to maneuver.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
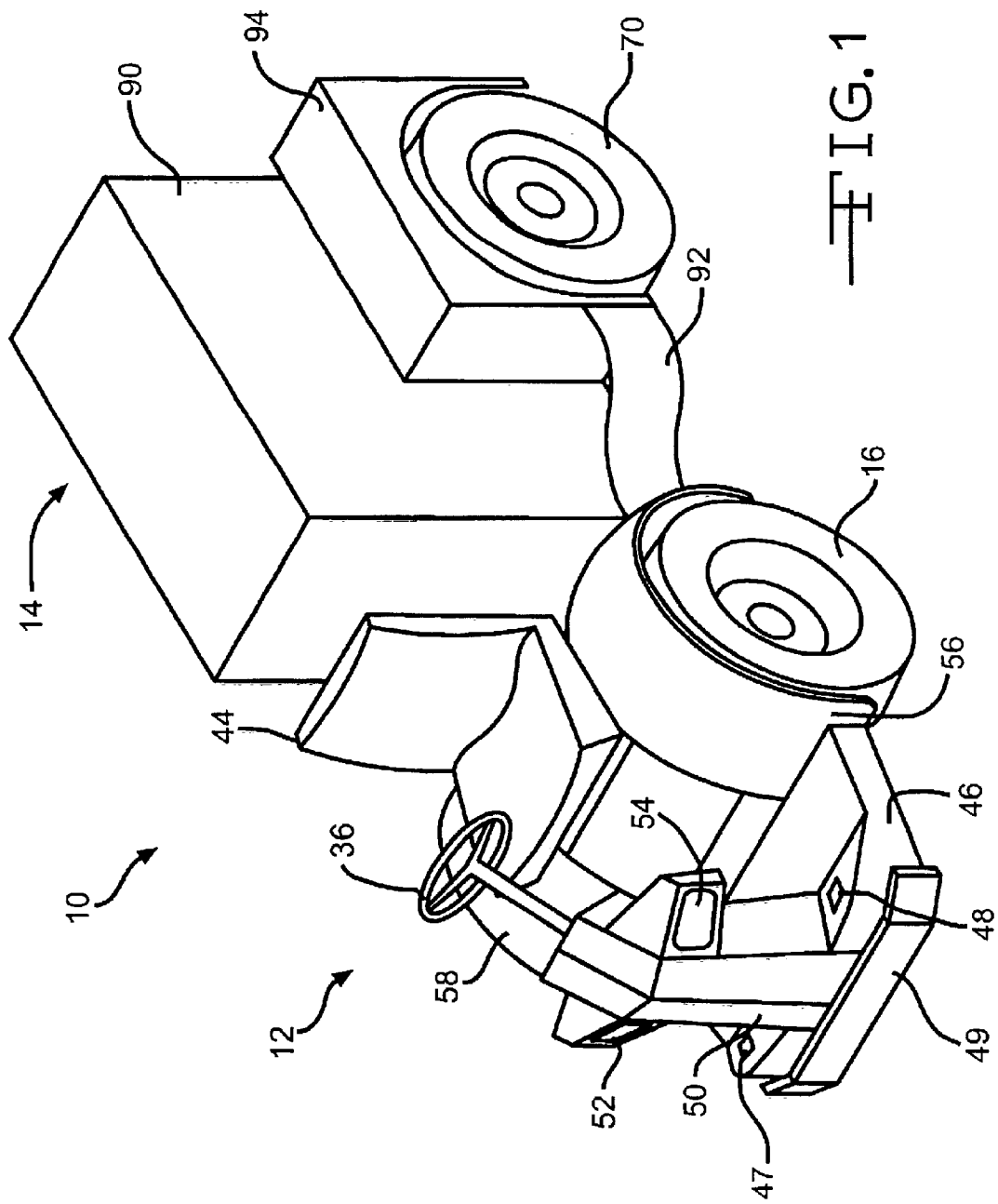
FIG. 1 is a front perspective view of an industrial truck according to the present invention.

The preferred embodiments and best mode of the present invention will now be described in detail with reference being made to the drawings. In the drawings, the industrial truck of the present invention is indicated generally by the reference number "10".

Referring to FIGS. 1–4, the truck 10 includes a drive portion 12 and a trailer portion 14. The drive portion 12 includes a pair of wheels 16 and 18 that are mounted on a drive axle 20 connected to a differential gear reducer 22. The wheels 16 and 18 are operatively connected to brakes such as disc brakes 24 and 26, respectively.

Figure 2:
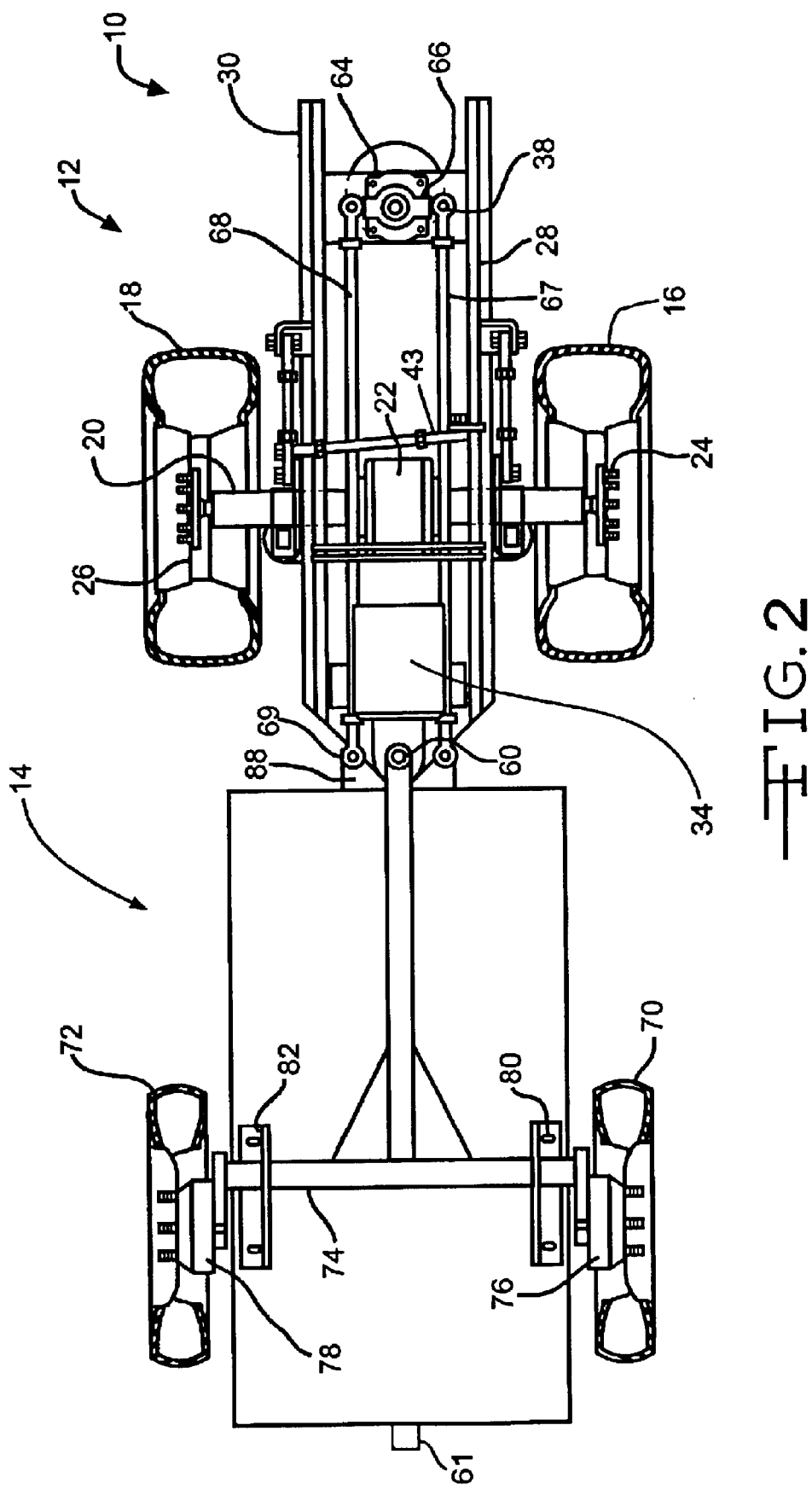
FIG. 2 is a partial cross-sectional, bottom view thereof.
Figure 3:
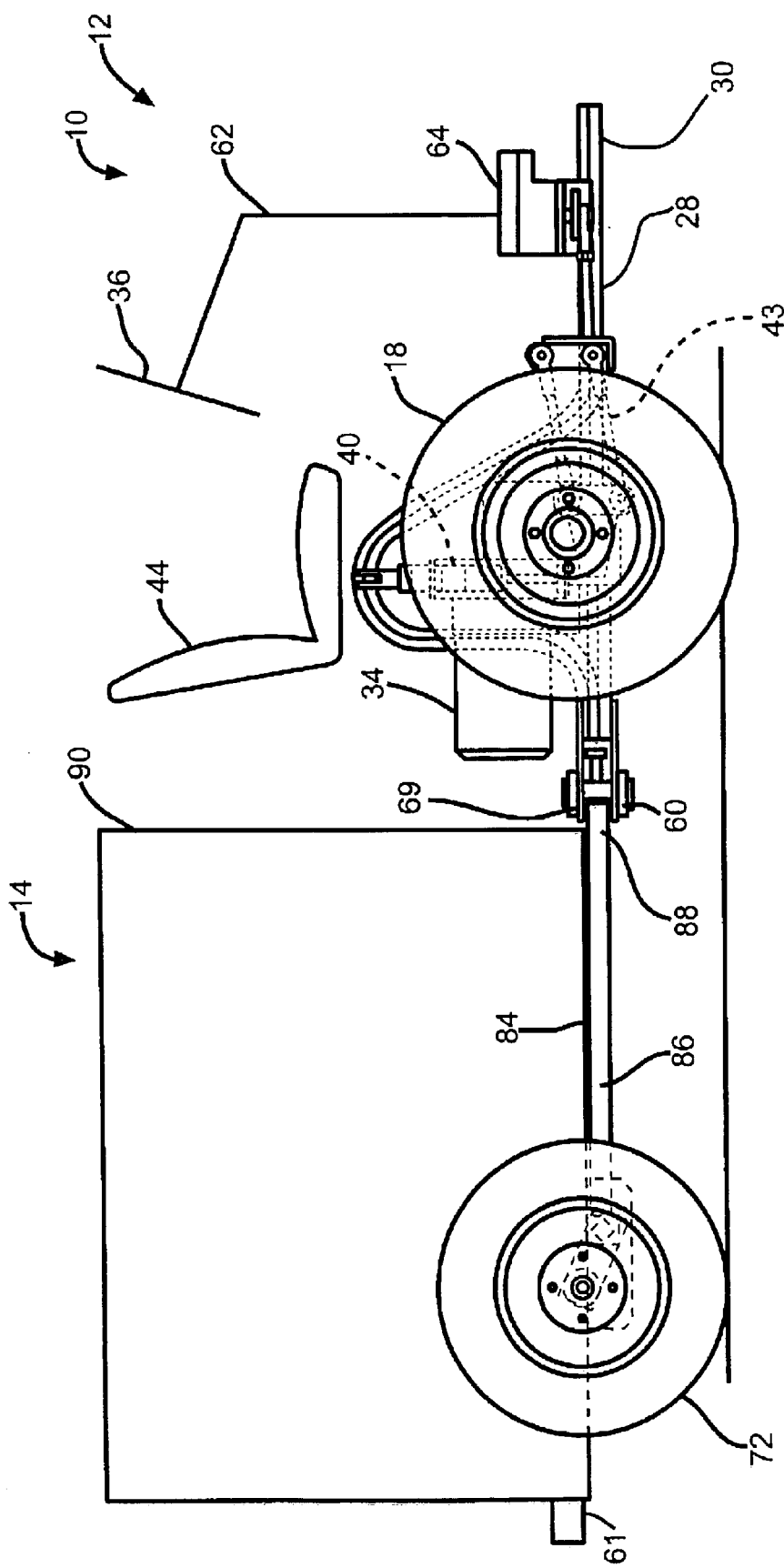
FIG. 3 is a side elevational view thereof.
Figure 4:
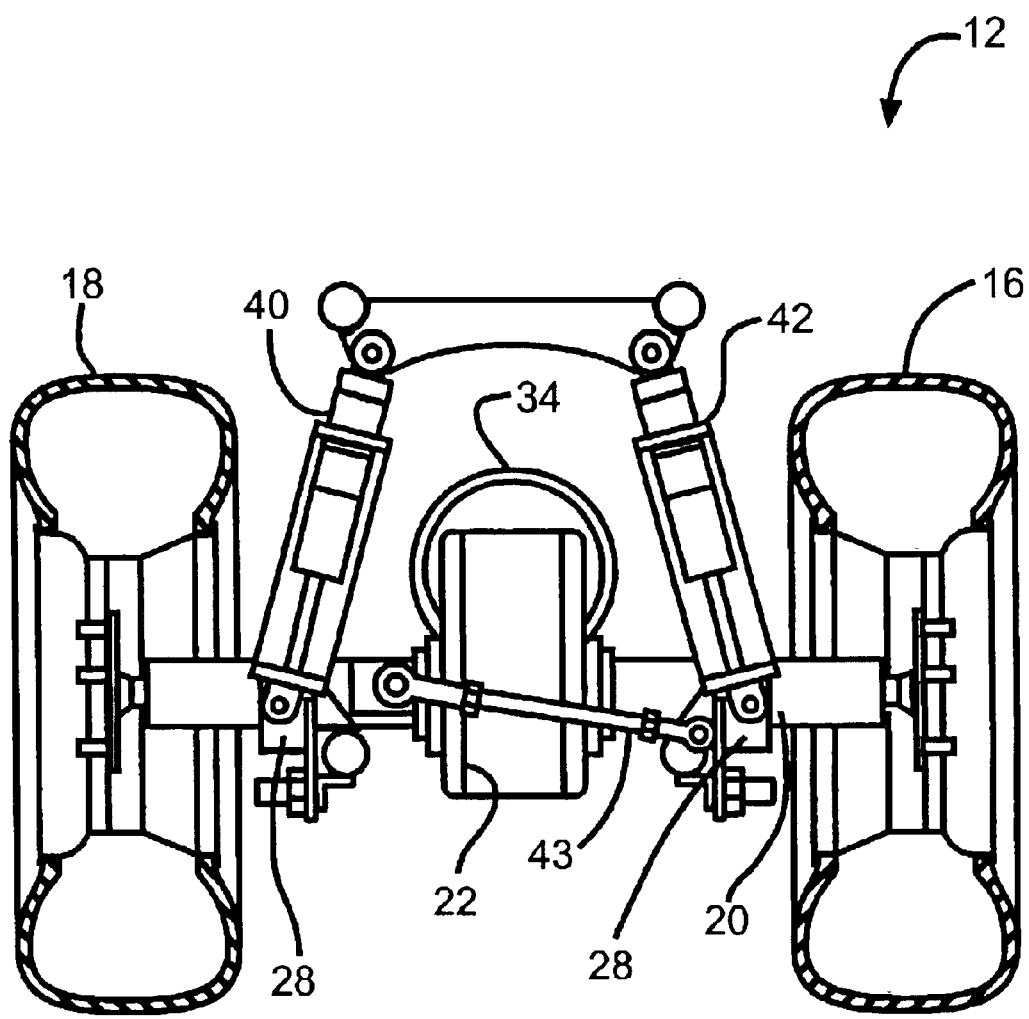
FIG. 4 is a partial cross-sectional, front elevational view thereof.

As shown in FIG. 2, the drive portion 12 includes a frame 28 having a front 30 and a back 32. An electric motor 34 is mounted and operatively connected to the gear reducer 22 to drive the wheels 16 and 18. As shown in FIGS. 3 and 4, the frame 28 is suspended from the drive axle 20 by a pair of coil springs and shock absorbers 40 and 42 and a four bar linkage and panard bar unit 43 to maintain alignment of the drive axle 20.

As shown in FIGS. 1 and 3, the drive portion 12 includes a seat 44 positioned on the frame 28 over the drive axle 20. The drive portion 12 includes a footrest 46 positioned adjacent to the seat 44. An accelerator or vehicle speed control pedal 47 and a brake pedal 48 are positioned on the footrest 46. As shown in FIG. 1, a removable bumper 49 is positioned adjacent to the footrest 46. The bumper 48 can be removed to allow for the installation of, for example, a quick hitch or an electrical accessory. As shown in FIG. 1, the drive portion 12 includes a shroud 50 having one or more headlights 52 and 54. A pair of fenders 56 and 58 are positioned over the wheels 16 and 18, respectively.

As shown in FIGS. 2 and 3, the drive portion 12 includes a hitching device such as a pivot 60 positioned on the back 32 of the frame 28. The pivot 60 attaches the trailer portion 14 to the drive portion 12 at a slight angle, in the range of 2 to 3°. Functionally, the trailer portion 14 remains connected to the drive portion 12 at all times. An additional ball or pin hitch 61 is provided at the rear of the trailer portion 14 for towing additional trailer units.

Still referring to FIGS. 1–4, the drive portion 12 includes a steering wheel 36 and an inline gearbox 64 that is rigidly mounted to the frame 28. A dual rod linkage assembly 38 is operatively connected to the gearbox 64 and to the front of the trailer portion 14. The linkage assembly provides articulated steering of the industrial truck 10.

As shown in FIGS. 2 and 3, articulated steering is provided by the steering wheel 36 connected by a shaft assembly 62 to the gearbox 64. The gearbox 64 provides leverage by a set of internal gears that are set up to produce an output shaft that rotates opposite to that of an input shaft. A bell crank 66 connects the output shaft of the gearbox 64 to a pair of steering rods 67 and 68 to a second bell crank 69, which is rigidly connected to the trailer portion 14 at the pivot 60. When the steering wheel 36 is turned, the bell crank 66 creates a push force on one rod 67 or 68 and a pull force on the opposite rod 67 or 68 depending on the direction of turn. These forces act on the second bell crank 69. The resulting torque creates an opposing force on the housing of the gearbox 64 that causes the drive portion 12 to swivel in relation to the trailer portion 14 at the pivot 60. The trailer portion 14 and the drive portion 12 are allowed to swing up to 45° in each direction to provide a tight turning radius for the industrial truck 10.

Referring to FIGS. 1–3, the trailer portion 14 includes a pair of wheels 70 and 72 that are mounted on an axle 74. The wheels 70 and 72 are operatively connected to brakes such as drum brakes 76 and 78, respectively. Torsion suspension members 80 and 82 are operatively connected to the wheels 70 and 72, respectively. As shown in FIGS. 2 and 3, the trailer portion 14 includes a bed 84 having a support member 86 that includes a trailer end 88 for connection to the pivot 60. As shown in FIGS. 1 and 2, the trailer portion 14 carries a machine such as a welder 90 that includes a generator having auxiliary power outlets. It should be understood that the trailer portion 14 could carry a variety of machines having power outlets depending on the use of the truck 10. As shown in FIG. 1, the trailer portion 14 may include a tank holder 92. The trailer portion 14 may also be fitted to include a utility holder 94 for holding, for example, tools, boxes or supplies.

Figure 5:
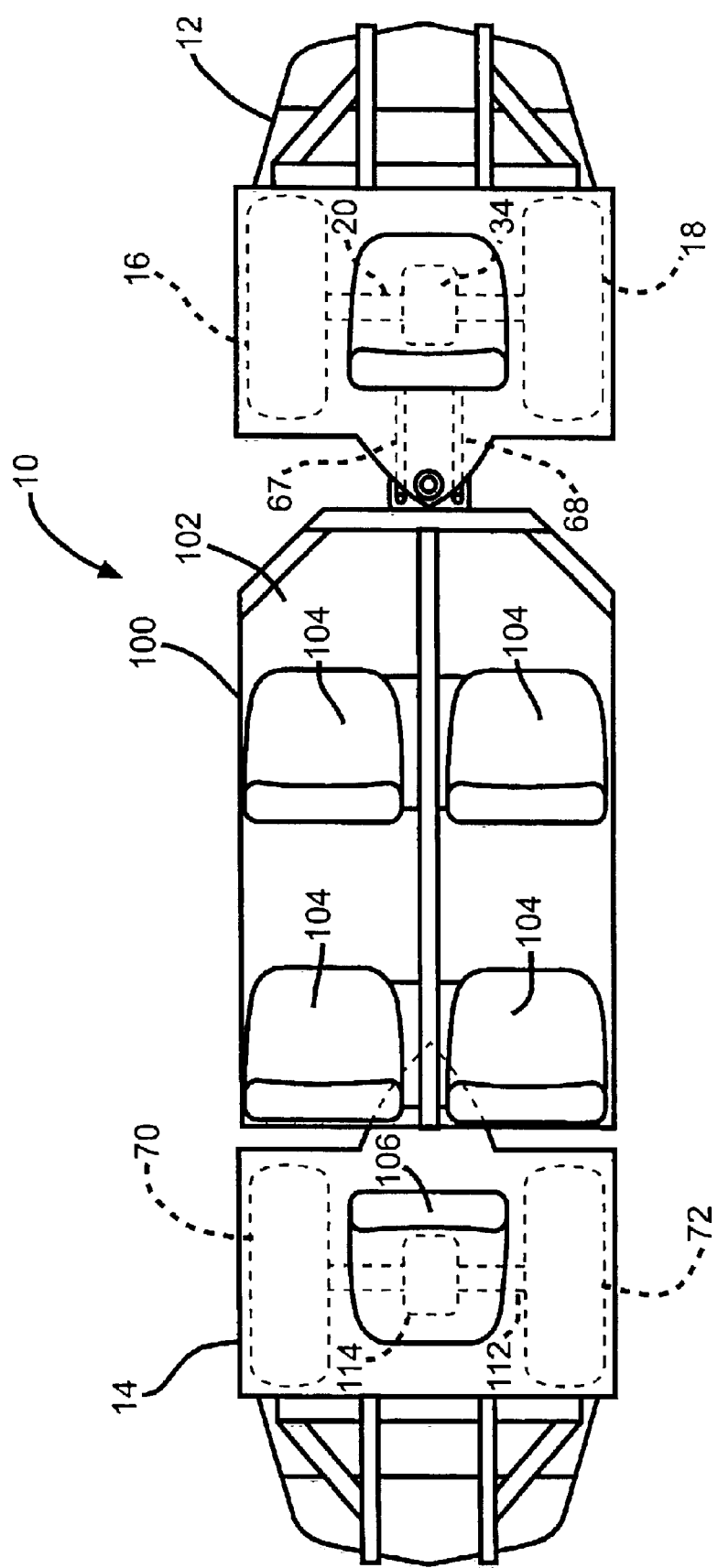
FIG. 5 is a plan view of a second embodiment industrial truck according to the present invention

A second embodiment industrial truck 10 is shown in FIG. 5. In this embodiment, the industrial truck 10 includes a drive portion 12 and a trailer portion 14 as described above with respect to the first embodiment industrial truck 10. The second embodiment further includes a center trailer portion 100 having a bed 102 upon which, for example, four seats 104 are positioned. A pair of steering rods 67 and 68, as described above, are connected to the center portion 100. A seat 106 is positioned on the trailer portion 12.

Figure 6:
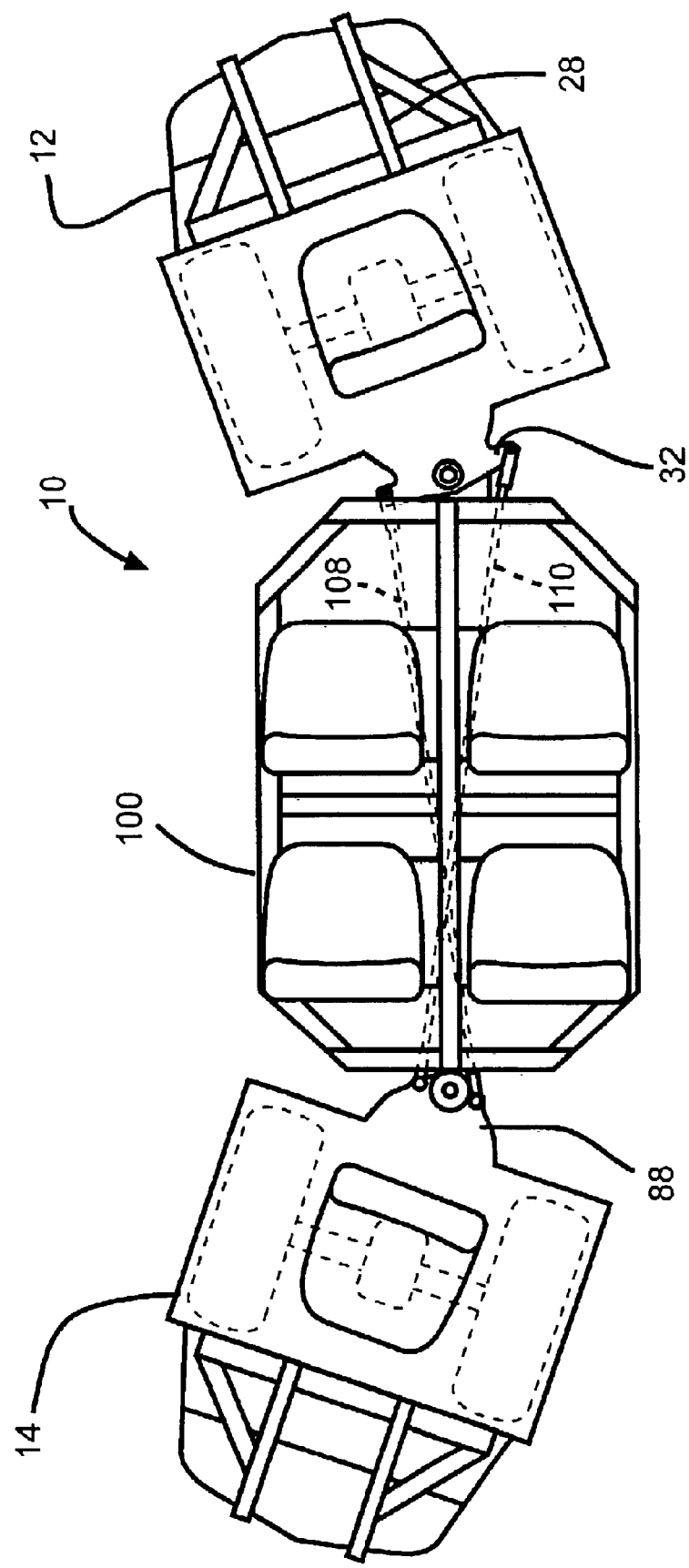
FIG. 6 is a plan view of a third embodiment industrial truck according to the present invention.

A third embodiment industrial truck is shown in FIG. 6. In this embodiment, first and second rods 108 and 110 extend diagonally across center between the back 32 of the frame 28 of the drive portion 12 and the trailer end 88 of the trailer portion 14 to provide for articulated steering.

In both the second and third embodiments, as shown in FIGS. 5 and 6, the wheels 70 and 72 of the trailer portion 14 are equipped with a drive axle 112 and an electric motor 114 including a gear reducer. The trailer portion 14 further includes coil springs, shock absorbers, a four bar linkage and panard bar unit and brakes as described above with respect to the first embodiment drive portion 12. As it will be appreciated, this provides for all-wheel drive using the two drive axles 20 and 112 and the two motors 34 and 114.

Figure 7:
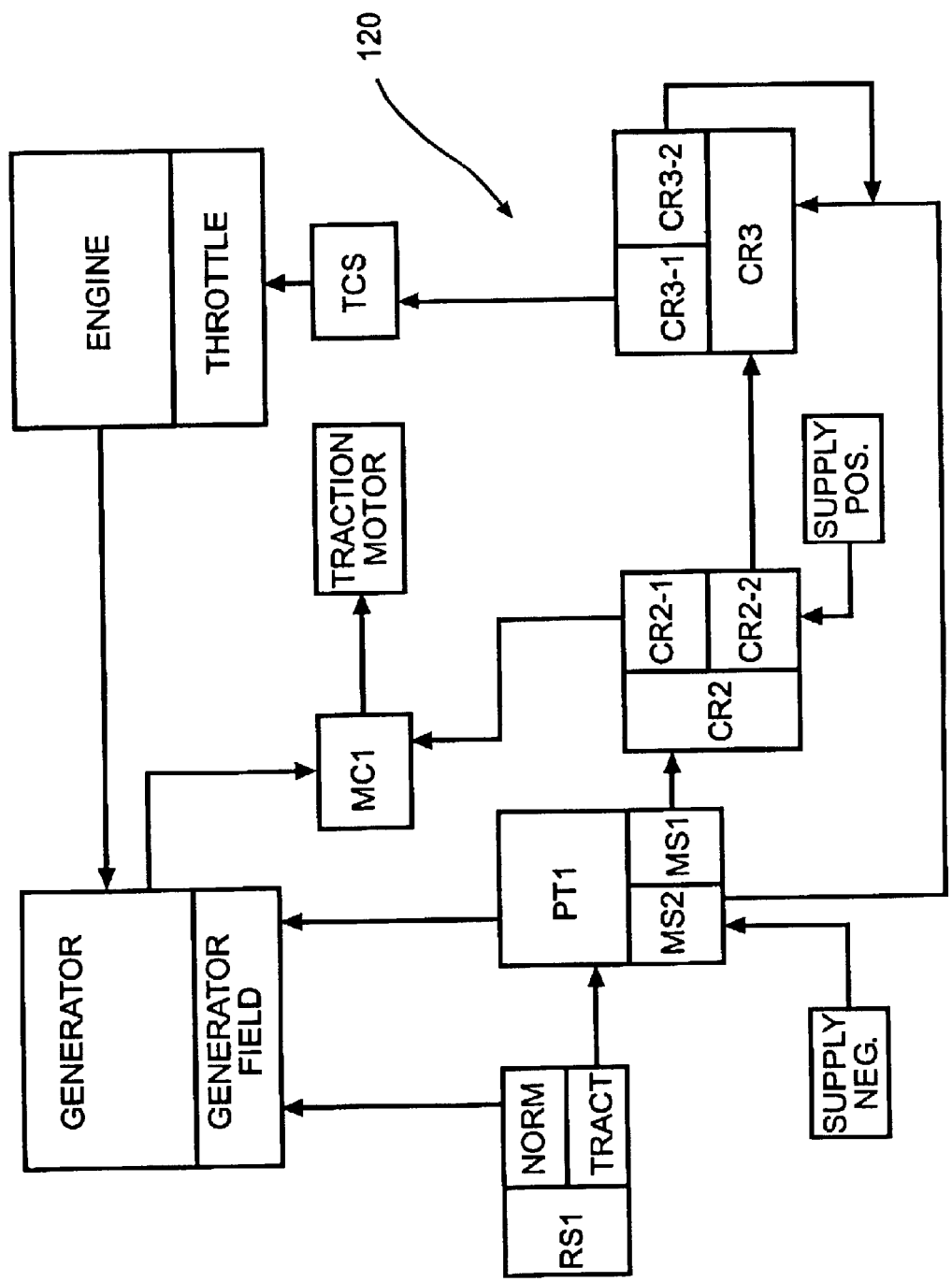
FIG. 7 is a block diagram of an electronic control device according to the present invention.
Figure 8:
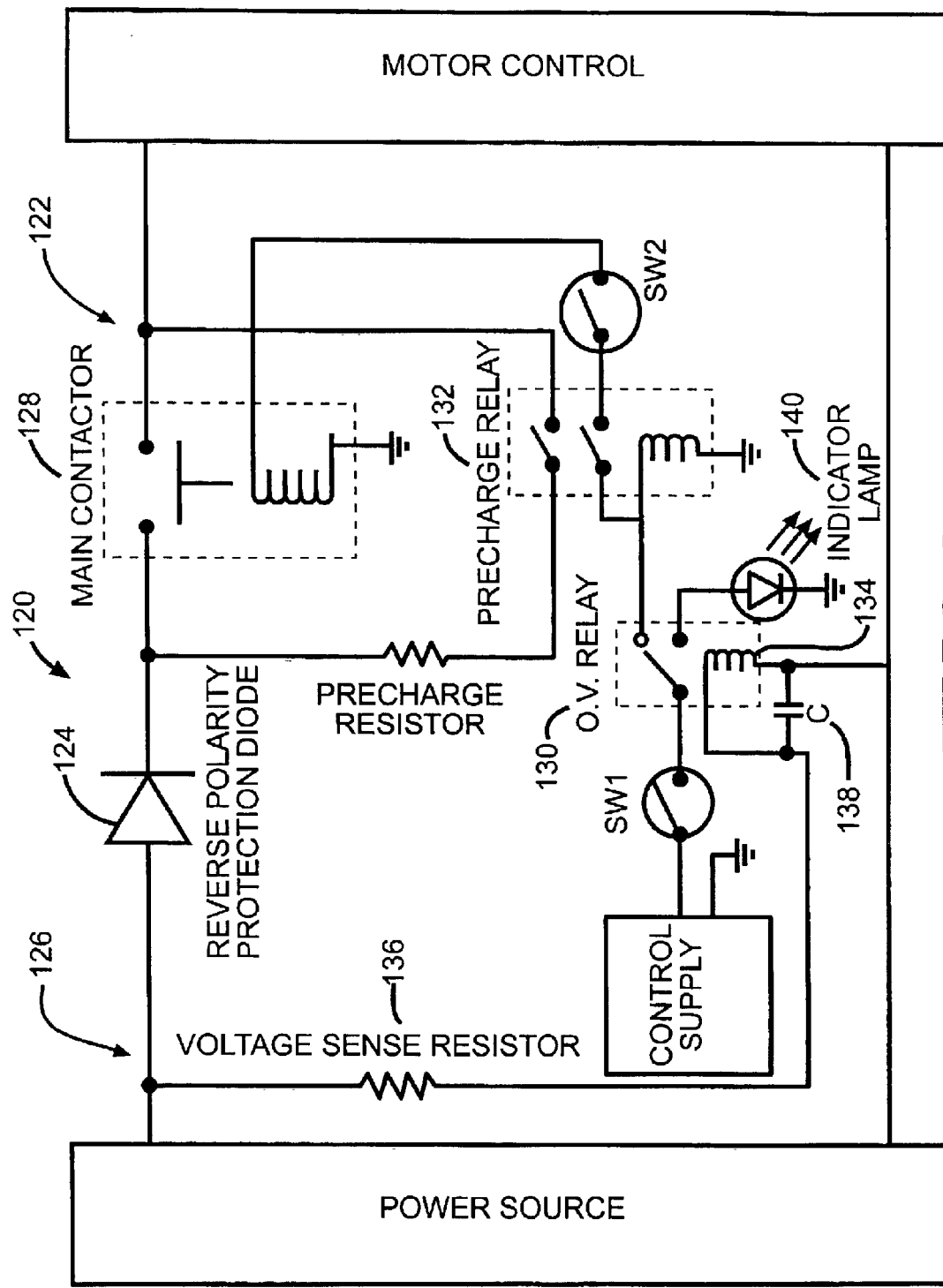
FIG. 8 is a block diagram of an electrical protection circuit according to the present invention.

The motor 34 of the drive portion 14 and also, if applicable, the motor 114 of the trailer portion 14 are connected to a power source such as the generator of the welder 90 by an electronic control device 120 as shown in FIGS. 7 and 8. The control device 120 provides start, stop, forward and reverse functions for the motors.

Referring to FIG. 7, the control device 120 changes the speed of the industrial truck 10 by varying the voltage output of the generator by controlling the field current of the generator and positioning the engine throttle. This is accomplished in such a manner as to utilize the existing engine throttle control that provides only idle and one governed speed and without added power electronics such as SCR or bridge inverters. The control device 120 provides two distinct engine power and speed modes with variable traction motor speed control in each mode for the motor 34 or the motor 114 (identified in FIG. 7 as "TRACTION MOTOR"). This control is provided to the operator by the pedal 47. Low speed mode, whereby the engine is at idle, provides low or creep vehicle speed and high speed mode provides smooth power addition to full power to negotiate grades or accelerate to top speed. A rotary switch (RS1) is provided to switch the generator settings from normal operation to traction mode. When switched to traction mode, the rotary switch (RS1) connects a potentiometer (PT1) to the generator field control and the latching relay (CR3) normally closed contact (CR3-1) to the engine throttle control solenoid (TCS). When the engine throttle control solenoid (TCS) is activated the engine speed is held to idle. The normally open contacts of the low speed switch (MS1) are connected in series with the coil of the control relay (CR2). The normally open contacts of the high speed switch (MS2) are connected to the negative potential and in series with the coil of latching relay (CR3). The vehicle speed control pedal activates the potentiometer (PT1) and low speed switch (MS1). When the vehicle speed control pedal 47 is slightly depressed, the low speed switch (MS1) closes, energizing the control relay (CR2). The control relay (CR2) closes two sets of normally open contacts, one contact (CR2-1) energizes the main contactor (MC1) and the second contact (CR2-2) connects the positive potential to the latching relay coil (CR3). The latching relay (CR3) is not energized as the contacts of the high speed switch (MS2) remains open. While energized, the main contactor (MC1) connects the traction motor to the generator power output. Further depression of the vehicle speed control pedal 47, rotates the potentiometer (PT1) which increases the generator field current. This action increases the voltage and current to the traction motor, which increases torque and speed to accelerate the vehicle while the engine throttle control solenoid (TCS) continues to hold the engine at idle. Full depression of the vehicle speed control pedal 47 closes the high speed switch (MS2), connected to the negative potential, which activates the latching relay (CR3) coil, thus opening normally closed contact (CR3-1) which interrupts the negative potential path to the engine throttle control solenoid (TCS). A second normally open contact (CR3-2) on the latching relay (CR3) is also activated which also connects negative potential to the latching relay (CR3) coil. This action will hold the latching relay (CR3) on even if the high speed switch (MS2) is subsequently opened. While the latching relay (CR3) is energized the engine is allowed to run at full governed speed. The increased speed to the generator will further increase generator output to its full potential. The traction motor may then develop full power to accelerate the vehicle, as long as the vehicle speed control pedal 47 remains fully depressed. When the operator begins to lift from the vehicle speed control pedal 47, the high speed switch (MS2) will be opened, however the latching relay (CR3) will remain energized keeping the engine at full governed speed. Further lifting of the vehicle speed control pedal 47, short of a complete lift off will turn the potentiometer (PT1) and reduce the generator field potential, proportionally decreasing power to the motor, thus decreasing vehicle speed. When fully released the vehicle speed control pedal 47 will once again open the low speed switch (MS1). The control relay (CR2) is deenergized, removing positive potential to the latching relay (CR3) causing it to close the normally closed contact (CR3-1). This action reenergizes the engine throttle control solenoid (TCS) returning the engine to idle and reduce generator output to minimum. In addition to slowing the engine, the low speed switch (MS1) also opens another set of contacts that deenergize the main contactor (MCl) coil and disconnects the motor from the generator, allowing the vehicle to coast or come to a stop. This action will continue until the rotary switch (RS1) is turned away from traction mode.

As shown in FIG. 8, the electronic control device 120 includes an electrical protection circuit 122 having a series diode 124 to protect against reverse polarity and a voltage sensing circuit 126 that prevents the main contactor relay switch 128 from being closed if voltage rises above a preset limit. The voltage sensing circuit 126 is connected across the power input from the power source. The voltage sensing circuit 126 consists of a small normally closed over-voltage relay 130 having contacts in series with a precharge relay 132. A small relay coil 134 is in series with a voltage sense resistor 136 that has a value set to cause the relay 130 to open when voltage is above the preset limit and preventing precharge relay engagement and thus prevents main contactor engagement. A capacitor 138 is connected across the small relay coil 134 to prevent its chattering when voltage is at or near the set point. An indicator lamp 140 is provided and is activated by normally open contacts of the small relay 130 to indicate to the operator the over-voltage condition.

In alternative embodiments, one or more batteries, a constant voltage generator, or a fuel cell is connected to the motor 34 through an electronic control device that provides start, stop, forward and reverse functions. The control device is equipped with a solid state controller which provides vehicle speed by varying the current flowing from the battery constant voltage generator or fuel cell to the motor 34 in the DC motor version of the control device, or is equipped with an inverter control which varies the frequency and current from the battery constant voltage generator or fuel cell to the motor 34 in the AC motor version.

The present invention lowers labor costs because only one person is needed to position equipment, such as a welder, for work. Further, less cabling is needed because the equipment can be moved closer to a job site.

The industrial truck 10 of the present invention provides tractive effort to climb hills and to pull a trailer to a job site. The low center of gravity, four-wheel suspension and braking system, allow the industrial truck 10 to operate effectively and efficiently on construction sites, in factories and at special events, such as motor sport events.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense.

We claim:

1. An industrial truck comprising:
   a drive portion having a motor being operatively connected to a welder having a generator and an engine;
   a control device operatively connected to said motor, said generator and said engine having an engine throttle control solenoid and a potentiometer to vary voltage output of said generator, said control device having an electrical protection circuit having a series diode to protect against reverse polarity and a voltage sensing circuit to limit said voltage output above a preset limit;
   a trailer portion for supporting said welder, said drive portion being pivotally connected to said trailer portion; and
   a steering system positioned on said drive portion being operatively connected to said trailer portion, said steering system having a steering device operatively connected to an inline gearbox operatively connected to a first bell crank operatively connected to a pair of steering rods operatively connected to a second bell crank positioned on said trailer portion to provide articulated steering for said industrial truck.

2. The industrial truck of claim 1, wherein said drive portion includes wheels and said drive portion includes a drive axle for said wheels operatively connected to a gear reducer operatively connected to said motor.

3. The industrial truck of claim 2, wherein each of said wheels of said drive portion is operatively connected to a brake.

4. The industrial truck of claim 2, wherein each of said wheels of said drive portion is operatively connected to a suspension device.

5. The industrial truck of claim 4, wherein said suspension device has a pair of coil springs and shock absorbers and a four bar linkage and panard bar unit operatively connected to said drive axle.

6. The industrial truck of claim 1, wherein said motor is an electric motor.

7. The industrial truck of claim 1, wherein said drive portion includes a seat and a footrest including a pedal operatively connected to said motor.

8. The industrial truck of claim 1, wherein said trailer portion includes wheels.

9. The industrial truck of claim 8, wherein each of said wheels of said trailer portion is operatively connected to a brake.

10. The industrial truck of claim 8, wherein each of said wheels of said trailer portion is operatively connected to a suspension device.

11. The industrial truck of claim 8, wherein said wheels of said trailer portion are operatively connected to a second motor being operatively connected to said power source welder.

12. The industrial truck of claim 1, wherein said industrial truck further includes a center trailer portion positioned between said drive portion and said trailer portion.

13. The industrial truck of claim 12, wherein a bed is positioned on said center trailer portion.

14. The industrial truck of claim 1, wherein said steering device is a steering wheel.

15. The industrial truck of claim 1, wherein said control device has a speed control pedal operatively connected to said engine throttle control solenoid and said potentiometer.

16. The industrial truck of claim 15, wherein said control device has at least one switch connected to at least one relay to act as a latching circuit to control said engine throttle solenoid.

17. The industrial truck of claim 16, wherein said engine operates between high and low speeds, said high speed being latched by pressing said speed control pedal downwardly and said low speed being latched by allowing said speed control pedal to return upwardly.

18. The industrial truck of claim 1, wherein said voltage sensing circuit has a normally closed over-voltage relay having contacts in series with a precharge relay and a relay coil in series with a voltage sense resistor having a value set to cause said over-voltage relay to open when said voltage output is above said preset limit.

19. The industrial truck of claim 18, wherein said voltage sensing circuit has a capacitor connected across said relay coil to prevent chattering.

20. The industrial truck of claim 18, wherein said voltage sensing circuit has an indicator lamp operatively connected to said relay to provide a visual indication that said voltage output is above said preset limit.

* * * * *